April 2, 1968 G. DE LEEUW 3,376,123
GLASS MOLDING DEVICE
Filed Sept. 24, 1964 2 Sheets-Sheet 2
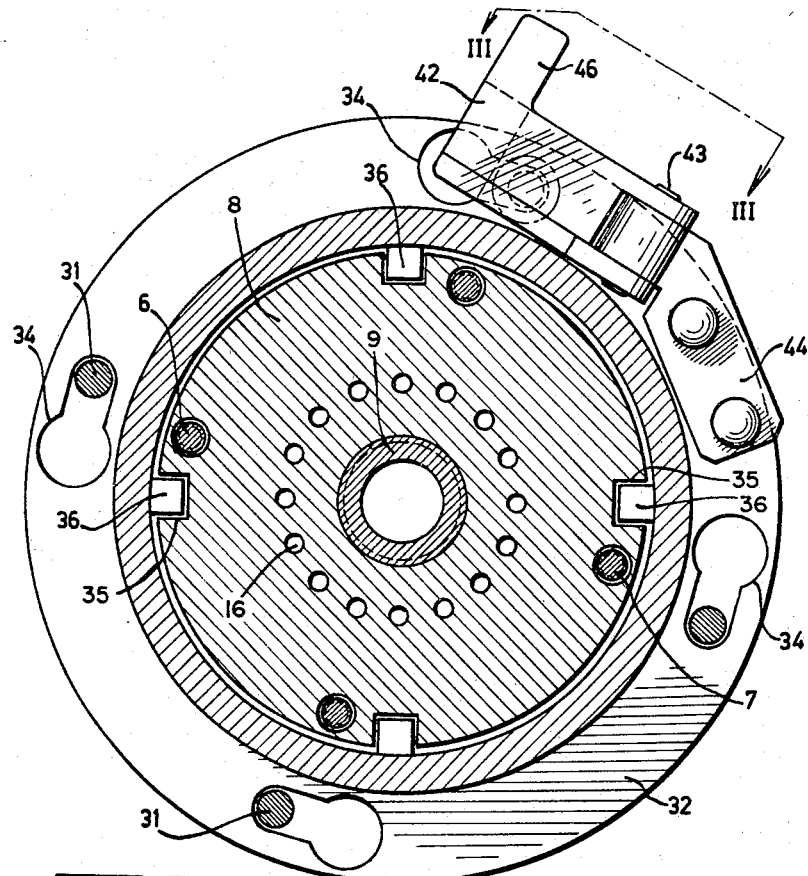
FIG:2.
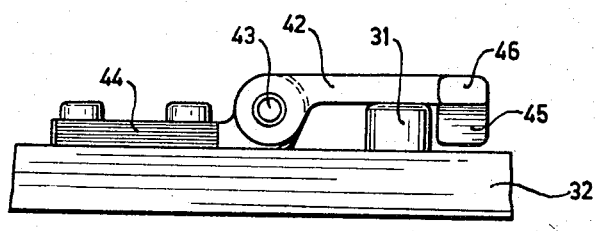
FIG:3.
INVENTOR.
GERRIT de LEEUW

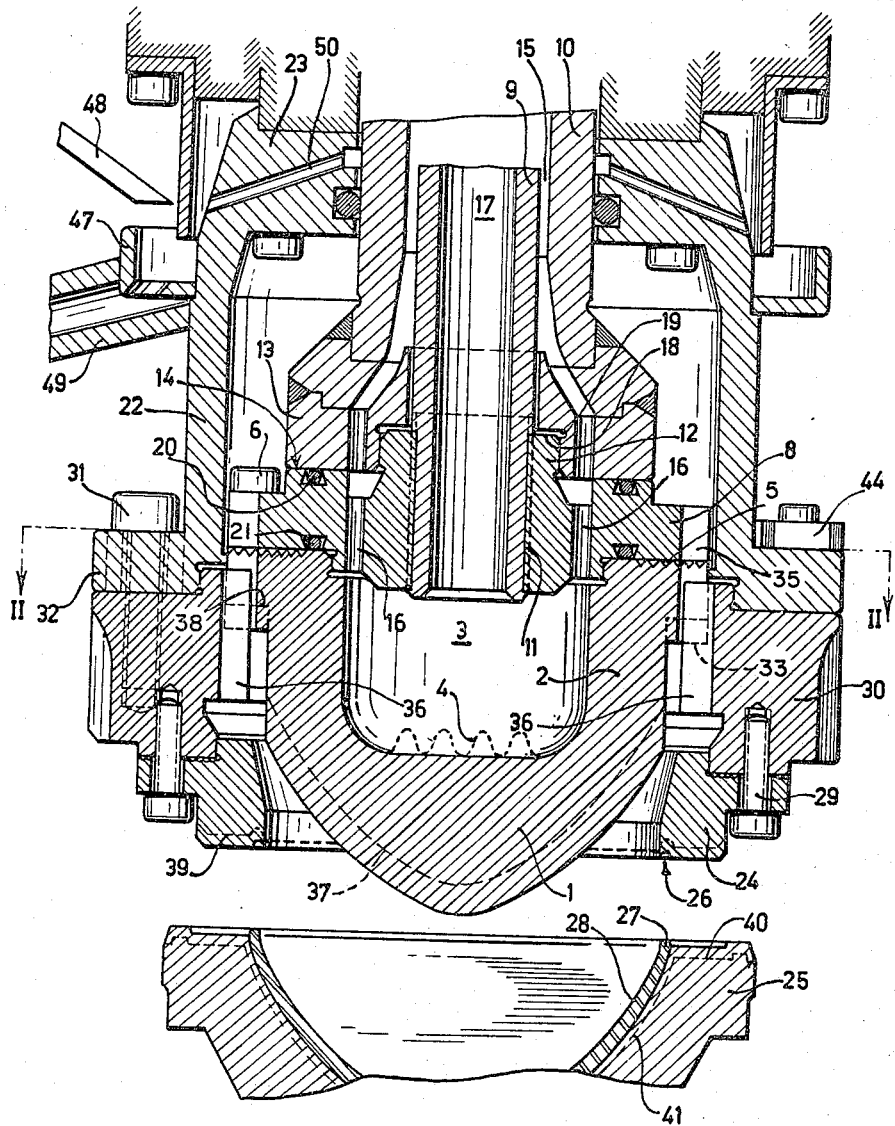

United States Patent Office 3,376,123
Patented Apr. 2, 1968

3,376,123
GLASS MOLDING DEVICE
Gerrit de Leeuw, Leerdam, Netherlands, assignor to N.V. Vereenigde Glasfabrieken (United Glassworks), Schiedam, Netherlands
Filed Sept. 24, 1964, Ser. No. 398,962
1 Claim. (Cl. 65—308)

ABSTRACT OF THE DISCLOSURE

A glass molding apparatus having a plunger which has a cavity supplied with coolant and which is easily replaceable with another similar plunger. The coolant is conducted into and out of the cavity by means of two coaxial hollow spindles which engage an annular covering disk at their lower ends, which disk is secured onto the inner spindle and engages the top of the plunger, the plunger and spindles being enclosed by a cap which has a mold ring at its lower end, and ribs on its side which extend into vertical splines on the covering disk so that the plunger drops downwardly until it engages the mold ring when the covering disk is disengaged from the inner spindle. Removal of the plunger is accomplished by removing the mold ring from the cap.

---

The invention relates to a device for molding glass articles, comprising one or more plungers, which have a vertical stroke with respect to a mold table on which the molds are arranged in centered position with respect to the plunger axis, the plunger having a dish-shaped lower end and an annular side portion extending upwardly from the end with which a covering disk is united which is provided with means for connection to the spindle of the plunger.

Such plungers are usually manufactured from high quality steel so that in use problems arise because of the requirements that the plunger be continuously cooled and at the same time be readily replaceable.

The cooling must be more intensive as the frequency of the successive pressing strokes is made higher to increase production, because the degree of cooling is determinative of the quality of the glass articles produced.

The quick exchangeability of the plungers is required, because often successive series of different articles have to be manufactured, and because after a certain number of articles have been molded, the plunger has to be removed so that its surface may be corrected.

The principal object of the present invention is to provide a device of the type mentioned which meets with high requirements as to the cooling, but which moreover is made in such a way that easy exchangeability of the plunger is possible.

It is also an object of the invention to provide an easily exchangeable mold ring. Other objects and features will appear from the following detailed description, which is to be read in connection with the accompanying drawing.

In the drawing:

FIGURE 1 is a vertical section through the portion of a plunger machine to which the invention relates, showing also a part of a mold.

FIG. 2 is a horizontal sectional view taken along the line II—II of FIG. 1.

FIG. 3 is a vertical detail taken along the line III—III of FIG. 2.

The dish shaped lower portion 1 of the plunger is shown in FIG. 1. In the figure it is shown that within the annular side portion 2 a large cooling space 3 is provided; for the plunger dish 1. It has also been indicated by broken lines that one may enlarge the cooling surface by providing ribs 4 or similar projects or grooves.

The upper face 5 of the side portion 2 is drawn, by means of a plurality of bolts or claws, two of which being indicated by 6 and 7, tightly against a ring disk 8 (see also FIG. 2). Thereby use is made of outwardly projecting flanges of the disk 8 and of the dish shaped portion 1 of the plunger and because the ring shaped covering disk 8 constitutes a separate part, a more easy treatment of the cavity of the plunger is possible, whilst nevertheless the whole may be connected tightly but detachably to the spindle 9 which is the inner one of two hollow spindles, the outer one of which is indicated by 10. The inner spindle 9 bears the plunger 1, 2 by means of thread 11, which is provided at its end, and upon which the collar 12 of the disk 8 has been screwed with thread provided in its central aperture.

The outer hollow spindle 10 has a broadened foot 13, the lower face 14 of which makes rigid contact with the disk 8 when the plunger is secured into the inner hollow spindle 9.

One of the hollow spindles thus serves as an easily detachable connection, the other one an immobile support.

The inner space 17 of the spindle 9 is connected to the centre of the cavity 3 in the plunger, and the ring shaped space 15 between the hollow spindles constitutes a discharge canal for the cooling medium, being in communication with a plurality of borings 16 arranged in and extending through a circle in the disk 8 around the collar 12. Thus, the circulation of the cooling medium is assumed.

The upper edge 18 of the collar 12 will seat in a cavity 19 of the foot 13, and elastic rings 20 and 21, assure sealing between the disk 8 and the upper face 5 of the plunger and between the disk 8 and the foot 13. It will be observed that the cooling circuit is automatically completed when the plunger is connected to the spindle.

From FIG. 1 it can further be seen that the above described portions are surrounded by a cap 22, which constitutes the lower end of a bearing 23 for the spindle 10, which bearing is not described here any further, as it may be constructed in any well-known manner. It is pointed out, however, that this bearing 23 with the cap 22 constitutes a portion of the molding device which is movable as a whole in the axial direction, and which supports at the lower end the so-called mold ring 24, which in its lowermost position constitutes the upper covering of the mold 25. From the figure it can be seen that this mold ring can indeed close and complete the mold 25, the mold ring being provided with an annular groove 26 for forming a bead 27 to the glass object 28 to be molded, e.g. the foot of a chalice.

The mold ring 24 is connected by means of bolts like 29 to an intermediate ring 30, which again by means of bolts like 31 may be suspended from and connected to the lower flange 32 of the cap 22. The cap 22, intermediate ring 30 and mold ring 24 constitute a cap assembly.

The mold ring 24 respectfully projects inwardly with respect to the intermediate ring 30 in order that the whole of plunger 1, 2 and its covering disk 8 may be laid into the loose intermediate ring 30 with the mold ring 24 fixed thereto, the broadened base 33 of the plunger resting upon the mold ring 24. This unit may be lifted, placing the heads of the bolts 31 through apertures in the flange 32 of the cap 22.

As shown in FIG. 2 the openings 34 are formed to make a bayonet-joint, so that after having turned the intermediate ring 30 through a certain angle to the right, one can transform the suspension into a fixed connection by turning two of the bolts 31, lying opposed to each other, or eventually all of those bolts. Then the collar 12 will lie in a centered position under the spindle 9, which has been lifted over a short distance by the disk 8 while inserting the bayonet-joint. When screwing the plunger 1, 2 with its thread onto the end of the spindle 9, the upper face of the disk 8 will find a stop at the face 14 of the foot 13.

Rotation of the plunger is prevented because the broadened base 33 is provided with splines 35 in which ribs 36 of the intermediate ring 30 fit. Thus the plunger is movable in the vertical direction but is secured against rotation.

This is of importance not only for centering a plunger having e.g. angular shape, in order that it will always push into the mould in the right position, but especially as will be clear, in this way a quick insertion and replacement of plunger and mold ring are possible, as the screw connection 11 may be fastened by simply turning the spindle 9 from above, thereby turning its thread into the central aperture of the collar 12 of the ring 8. Replacement of the plunger and mold ring is always necessary after the manufacture of a series of molded articles as the various parts then have to be subjected to a correction treatment as regards shape and surface conditions.

In FIG. 1 broken lines 37 and 38 indicate which portions of the plunger may be taken off in correcting the surface. The plunger will still be usable for molding the same glass articles.

The same has been indicated for mold ring 24 by the broken line 39. In the mold 25 broken lines 40 and 41 indicate in similar manner which portions may be taken away in order to make the necessary correction.

In FIGS. 2 and 3 is shown a securing device which prevents the plunger and mold ring from falling out if the bolts 31 were inadvertently left untightened. In such a situation one might then temporarily work with a plunger and mold ring which have a clearance in the vertical direction, but this will be observed immediately and serious damage will not be caused. The securing device is constituted by a clip 42, which is rotatable about a pivot 43, the foot 44 of which is secured on the flange 32. When closing the bayonet-joint, the extension 45 of the clip 42 grips behind the head of one of the bolts 31 of ring 30. When loosening the bayonet-joint, the clip may be lifted by means of the extension 46.

FIG. 1 further shows that the cap 22 may be provided with an annular gutter 47 and a spout 48 through which cooling medium may be supplied which is discharged by the tube 49. Borings 50 are provided so that superfluous lubricant may be discharged into the gutter 47.

Having described my invention with reference to the drawing of an embodiment, I do not want to be limited to the various details of this embodiment, further than I am limited by the scope of the following claim.

What I claim is:

1. Apparatus for molding glass articles in a mold comprising a plunger (1, 2), a cavity (3) in said plunger, said cavity extending downwardly into said plunger from the top thereof, a covering disk (8), said covering disk being secured to the top of said plunger, an aperture centrally located in said covering disk, a hollow outer spindle (10) extending downwardly into abutment with said covering disk, a hollow inner spindle (9) within said hollow outer spindle, said hollow outer spindle and said hollow inner spindle defining an annular space (15) therebetween, said hollow inner spindle (9) being threadedly engaged with said covering disk (8), the interior of said hollow inner spindle (9) being in communication with said cavity (3), a plurality of bores (16) extending through said covering disk between said cavity and said annular space, a cap (22), said cap encircling said hollow outer spindle (9), a mold ring (24) connected with the bottom of said cap (22), said mold ring (24) encircling said plunger (1, 2) and having an inside diameter which is less than the outside diameter of said plunger, means (31, 34) for quickly releasing said mold ring from connection with said cap, and means (35, 36) to prevent rotation of said covering disk with respect to said cap, whereby said hollow inner spindle may be rotated to unscrew therefrom said covering disk and thereby permit said covering disk and said plunger to fall onto said mold ring (24) said mold ring being detachable from said cap (22) to free said plunger (1, 2) from said apparatus.

References Cited

UNITED STATES PATENTS

| | | | |
|---|---|---|---|
| 2,020,032 | 11/1935 | Kadow et al. | 65—356 X |
| 2,570,817 | 10/1951 | Kinker | 65—356 X |
| 3,024,571 | 3/1962 | Abbott et al. | 65—319 X |
| 3,273,991 | 9/1966 | Denman | 65—307 |

S. LEON BASHORE, *Acting Primary Examiner.*

F. W. MIGA, *Assistant Examiner.*